(12) United States Patent
Pan et al.

(10) Patent No.: US 11,375,548 B2
(45) Date of Patent: Jun. 28, 2022

(54) PHYSICAL RANDOM ACCESS CHANNEL PREAMBLE BASED ON HIDDEN NODE DETECTION

(71) Applicant: IDAC HOLDINGS, INC., Wilmington, DE (US)

(72) Inventors: Kyle Jung-Lin Pan, Saint James, NY (US); Fengjun Xi, San Diego, CA (US)

(73) Assignee: IDAC Holdings, Inc., Wilmington, DE (US)

( * ) Notice: Subject to any disclaimer, the term of this patent is extended or adjusted under 35 U.S.C. 154(b) by 8 days.

(21) Appl. No.: 16/596,470

(22) Filed: Oct. 8, 2019

(65) Prior Publication Data
US 2020/0112996 A1  Apr. 9, 2020

Related U.S. Application Data

(63) Continuation of application No. 62/742,703, filed on Oct. 8, 2018.

(51) Int. Cl.
*H04W 74/00* (2009.01)
*H04W 74/08* (2009.01)
(Continued)

(52) U.S. Cl.
CPC ....... *H04W 74/0833* (2013.01); *H04L 1/1858* (2013.01); *H04L 12/413* (2013.01);
(Continued)

(58) Field of Classification Search
CPC ... H04L 1/1864; H04L 1/1896; H04L 1/1816; H04L 1/1819; H04L 12/413;
(Continued)

(56) References Cited

U.S. PATENT DOCUMENTS

2017/0048880 A1*  2/2017  Anderson ......... H04W 72/1226
2019/0053193 A1*  2/2019  Park ..................... H04W 76/11
(Continued)

OTHER PUBLICATIONS

Interdigital, Inc., "Initial Access and Mobility Procedures in NR-U," 3GPP TSG RAN WG1 Ad-hoc Meeting 1901, R1-1900787, Taipei, Taiwan (Jan. 21-25, 2019).
(Continued)

*Primary Examiner* — Salvador E Rivas
(74) *Attorney, Agent, or Firm* — Volpe Koenig

(57) ABSTRACT

Methods, devices, and systems for physical random access channel (PRACH) access. A WTRU transmits a message to a gNB. The message includes a PRACH preamble from a first set. The method also includes performing a hidden node detection procedure prior to a random access response (RAR) window. The RAR window corresponds to the transmitted message. The method also includes attempting to receive a RAR in response to the transmitted message, during the RAR window. The method also includes retransmitting the message to the gNB, including a PRACH preamble from a second set, if the RAR is not received during the RAR window and a hidden node is detected; and retransmitting the message to the gNB, including a PRACH preamble from the first set, if the RAR is not received during the RAR window and the hidden node is not detected.

16 Claims, 10 Drawing Sheets

(51) Int. Cl.
*H04W 72/04* (2009.01)
*H04L 1/18* (2006.01)
*H04L 12/413* (2006.01)

(52) U.S. Cl.
CPC ..... *H04W 72/048* (2013.01); *H04W 72/0453* (2013.01); *H04W 74/00* (2013.01)

(58) Field of Classification Search
CPC ........ H04N 21/6375; H04N 21/64776; H04W 74/00; H04W 74/08; H04W 74/0833
See application file for complete search history.

(56) References Cited

U.S. PATENT DOCUMENTS

| | | | | |
|---|---|---|---|---|
| 2020/0008240 | A1* | 1/2020 | Golitschek Edler von Elbwart | ... H04W 76/11 |
| 2020/0107275 | A1* | 4/2020 | Cho | ..................... H04B 7/0695 |
| 2020/0329503 | A1* | 10/2020 | Da Silva | ............. H04W 72/046 |

OTHER PUBLICATIONS

International Telecommunication Union, "IMT Vision—Framework and overall objectives of the future development of IMT for 2020 and beyond; M Series Mobile, radio determination, amateur and related satellite services," Recommendation ITU-R M.2083-0 (Sep. 2015).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

* cited by examiner

PHYSICAL RANDOM ACCESS CHANNEL PREAMBLE BASED ON HIDDEN NODE DETECTION

CROSS REFERENCE TO RELATED APPLICATIONS

This application claims the benefit of U.S. Provisional Application No. 62/742,703, filed Oct. 8, 2019, the contents of which are incorporated herein by reference.

BACKGROUND

In some licensed assisted non-standalone access systems, an unlicensed band operation can rely on the assistance of a primary component carrier in a licensed band. In new radio (NR) unlicensed (NR-U) standalone operation, all functionalities and features may be fulfilled on unlicensed bands.

A base station (e.g., an eNB) and/or a wireless transmit/receive unit (WTRU) may use a random access procedure for WTRU initial access (e.g., to a cell or eNB), reset of uplink (UL) timing (e.g., to reset or align WTRU UL timing with respect to a certain cell), and reset of timing during handover (e.g., to reset or align WTRU timing with respect to the handover target cell). The WTRU may transmit a certain physical random access channel (PRACH) preamble sequence at a certain power PPRACH, which may be based on configured parameters and/or measurements. The WTRU may transmit the preamble using a certain time-frequency resource or resources.

SUMMARY

Methods, devices, and systems for physical random access channel (PRACH) access. A WTRU transmits a message to a gNB. The message includes a PRACH preamble from a first set. The method also includes performing a hidden node detection procedure prior to a random access response (RAR) window. The RAR window corresponds to the transmitted message. The method also includes attempting to receive a RAR in response to the transmitted message, during the RAR window. The method also includes retransmitting the message to the gNB, including a PRACH preamble from a second set, if the RAR is not received during the RAR window and a hidden node is detected; and retransmitting the message to the gNB, including a PRACH preamble from the first set, if the RAR is not received during the RAR window and the hidden node is not detected.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
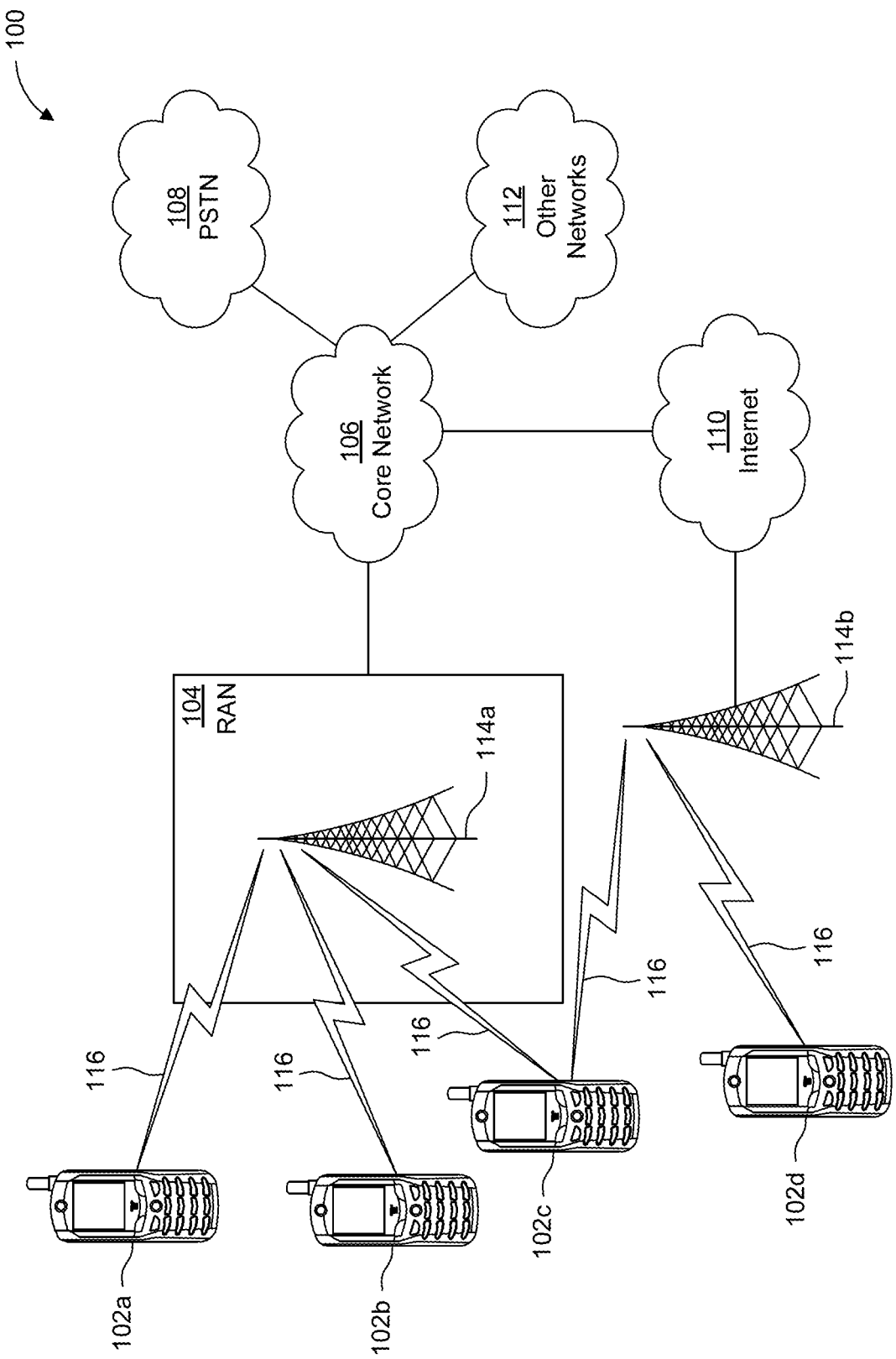
FIG. 1A is a system diagram illustrating an example communications system in which one or more disclosed embodiments may be implemented.

Some embodiments provide a WTRU configured for random access to a channel. The WTRU includes a receiver, a transmitter, and a processor. The receiver is configured to receive a first set of PRACH preambles and a second set of PRACH preambles. The transmitter is configured to transmit a message to a gNB, which includes a PRACH preamble from the first set. The WTRU processor is configured to perform a hidden node detection procedure prior to a random access response (RAR) window corresponding to the transmitted message. The receiver is configured to attempt to receive a RAR in response to the transmitted message, during the RAR window. The receiver is configured to retransmit the message to the gNB, including a PRACH preamble from the second set, if the RAR is not received during the RAR window and a hidden node is detected. The receiver is configured to retransmit the message to the gNB, including a PRACH preamble from the first set, if the RAR is not received during the RAR window and the hidden node is not detected.

In some embodiments, the hidden node detection procedure comprises a listen before talk (LBT) procedure to detect hidden nodes. In some embodiments, the transmitter is configured to retransmit the retransmitted message with power ramping if the hidden node is detected, and the transmitter is configured to retransmit the retransmitted message without power ramping if the hidden node is not detected. In some embodiments, the transmitter is configured to retransmit the retransmitted message with power ramping if the hidden node is not detected and if the WTRU has switched transmission antenna beam from the transmitted message. In some embodiments, the transmitter is configured to retransmit the retransmitted message without power ramping if the hidden node is not detected and if the WTRU has not switched antenna beam from the transmitted message. In some embodiments, the transmitter is configured to retransmit the retransmitted message without power ramping and using a same antenna beam as the transmitted message if the hidden node is detected.

In some embodiments, the processor is configured to perform a listen before talk (LBT) procedure before the transmitter transmits the message to the gNB. In some embodiments, the transmitter is configured to transmit the message to the gNB based on power ramping if the LBT procedure has failed a threshold number of times. In some embodiments, the processor is configured to repeat the LBT procedure if the LBT procedure has not failed a threshold number of times. In some embodiments, the transmitter is configured to retransmit the message using additional PRACH resources if the LBT procedure has failed a threshold number of times. In some embodiments, the receiver is configured to attempt to receive the RAR in an extended RAR window if the LBT procedure has failed a threshold number of times.

Some embodiments provide a method for random access to a channel by a WTRU. The method includes receiving a first set of PRACH preambles and a second set of PRACH preambles and transmitting a message to a gNB. The message includes a PRACH preamble from the first set. The method also includes performing a hidden node detection procedure prior to a RAR window. The RAR window corresponds to the transmitted message. The method also includes attempting to receive a RAR in response to the transmitted message, during the RAR window. The method also includes retransmitting the message to the gNB, including a PRACH preamble from the second set, if the RAR is not received during the RAR window and a hidden node is detected; and retransmitting the message to the gNB, including a PRACH preamble from the first set, if the RAR is not received during the RAR window and the hidden node is not detected, In some embodiments, the hidden node detection procedure includes a LBT procedure to detect hidden nodes. In some embodiments, the retransmitted message is retransmitted with power ramping if the hidden node is detected, and the retransmitted message is retransmitted without power ramping if the hidden node is not detected. In some embodiments, the retransmitted message is retransmitted with power ramping if the hidden node is not detected and the WTRU has switched transmission antenna beam from the transmitted message. In some embodiments, the retransmitted message is retransmitted without power ramping if the hidden node is not detected and the WTRU has not switched antenna beam from the transmitted message. In some embodiments, if the hidden node is detected, the retransmitted message is retransmitted without power ramping and using a same antenna beam as the transmitted message.

In some embodiments, the method includes performing a LBT procedure prior to transmitting the message to the gNB. In some embodiments, the method includes transmitting the message to the gNB based on power ramping if the LBT procedure has failed a threshold number of times. In some embodiments, the method includes repeating the LBT procedure if the LBT procedure has not failed a threshold number of times. In some embodiments, the method includes retransmitting the message using additional PRACH resources and attempting to receive the RAR in an extended RAR window, if the LBT procedure has failed a threshold number of times, FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
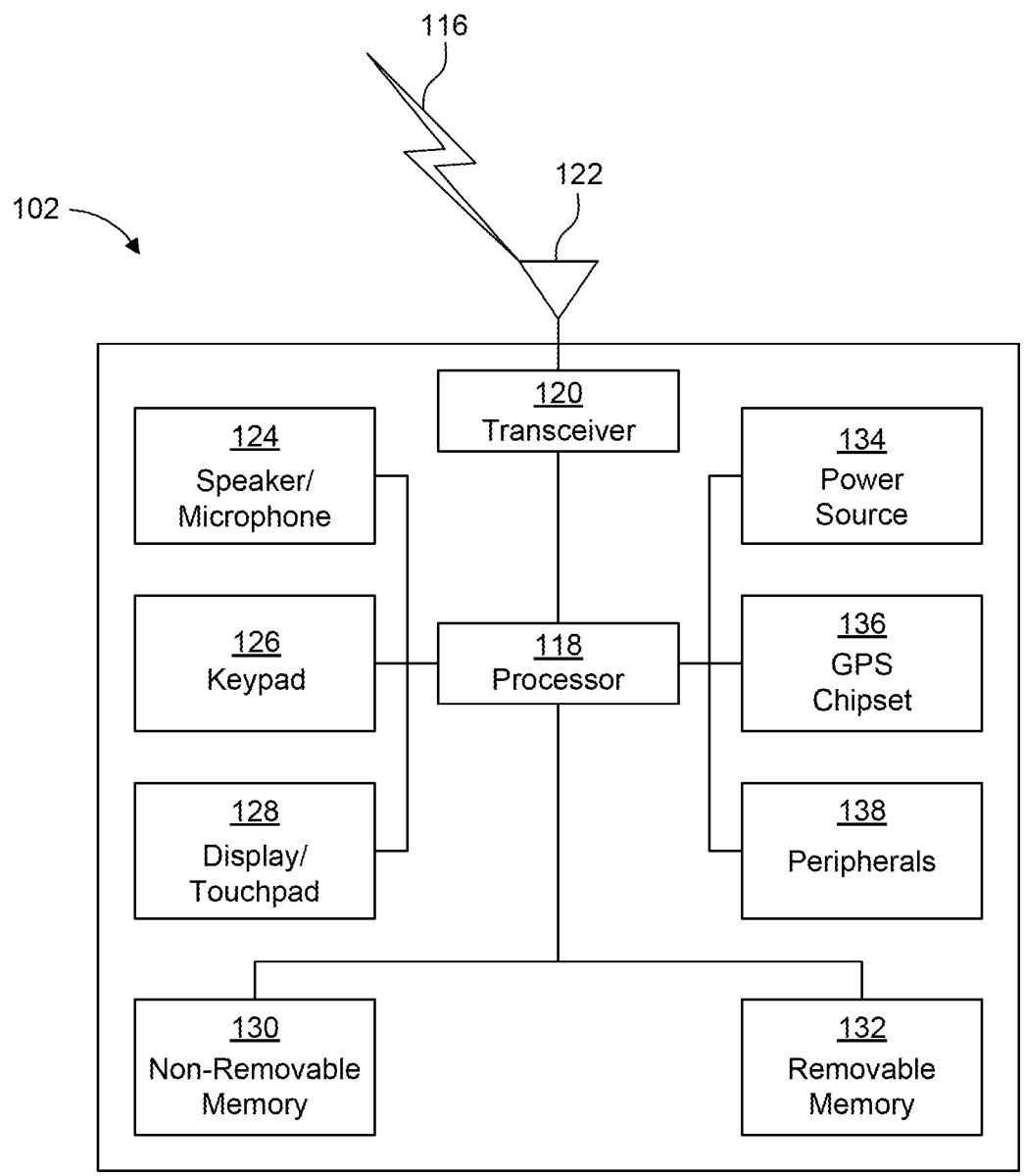
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
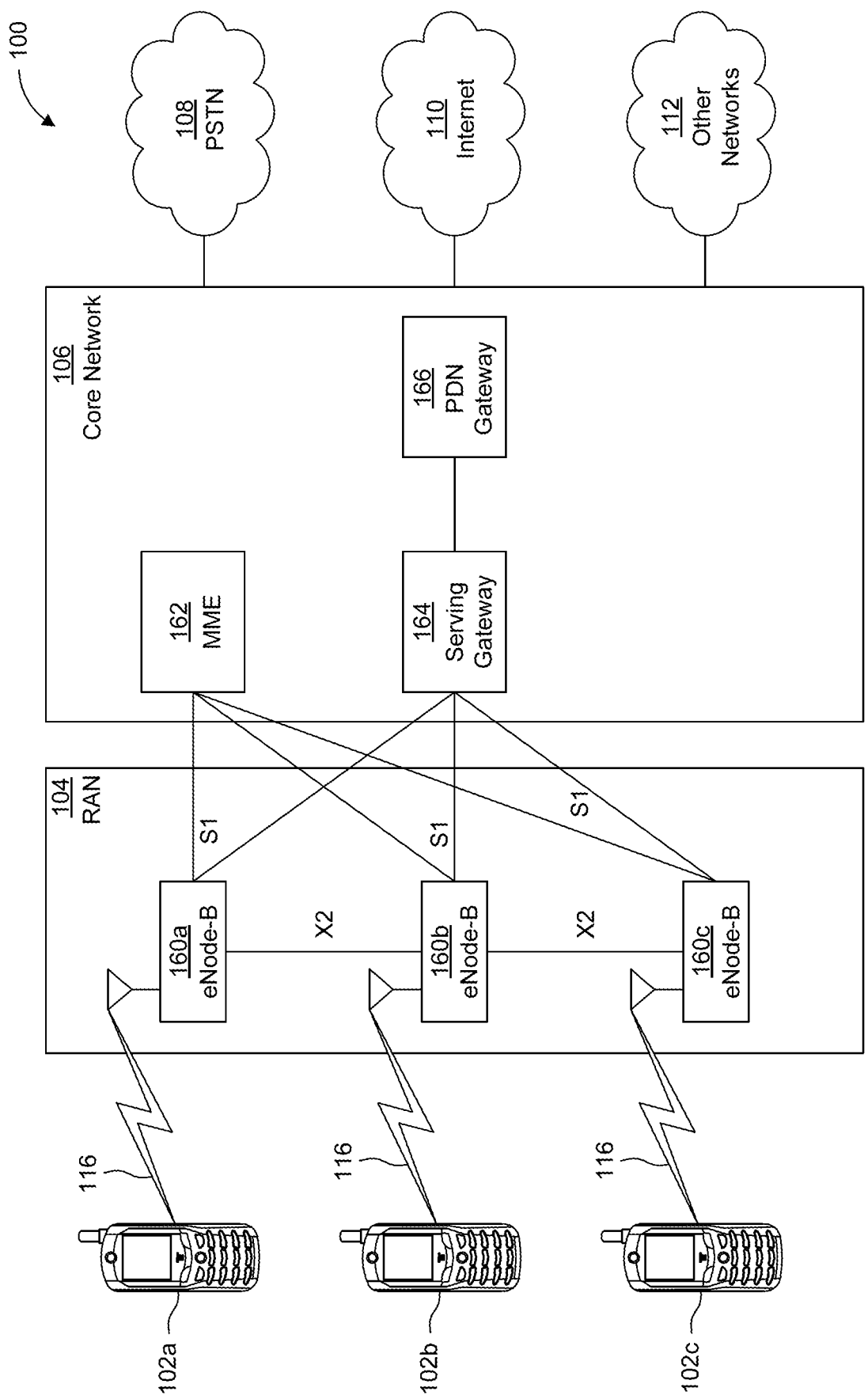
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
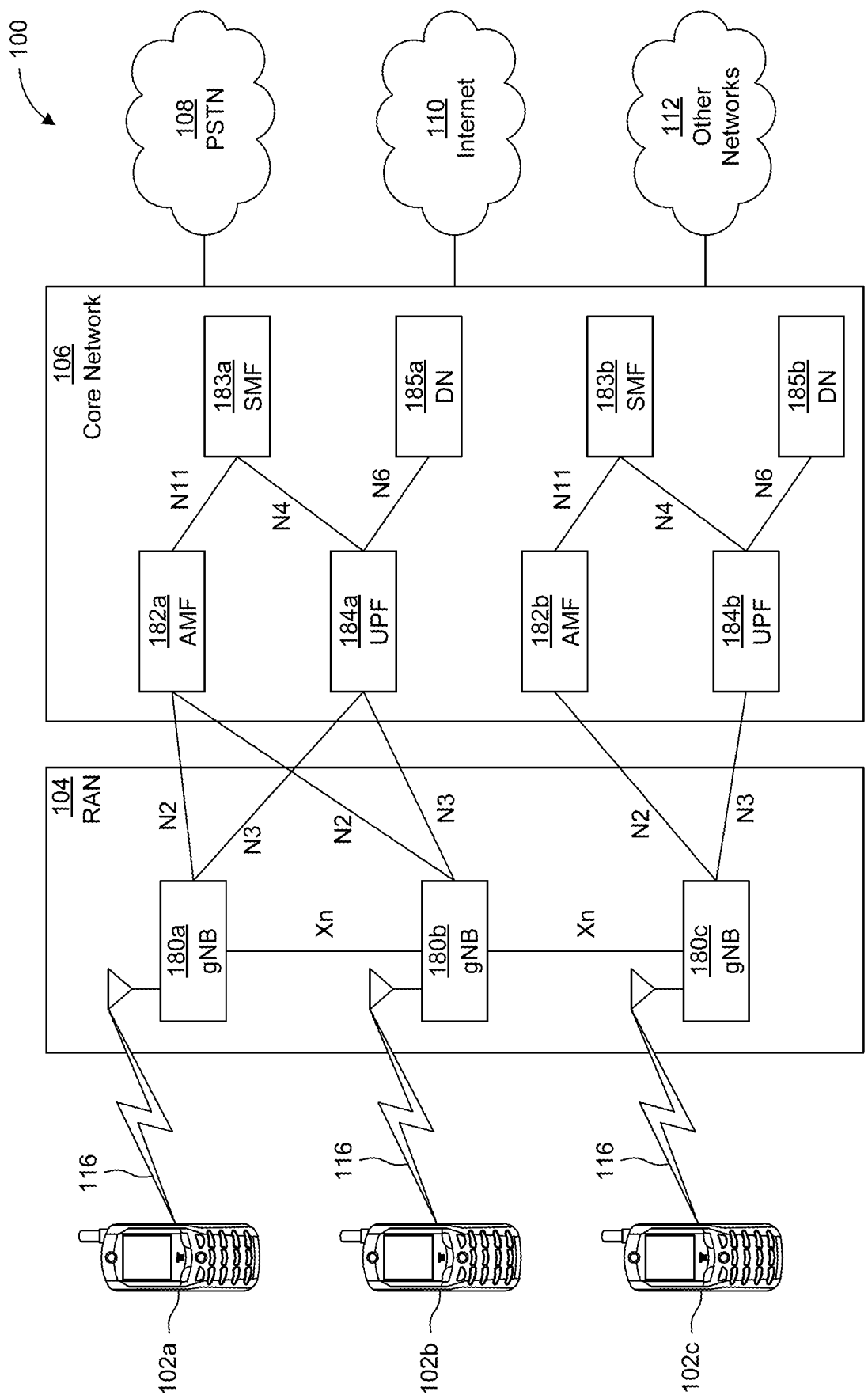
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Classes of use cases for emerging 5G systems may include Enhanced Mobile Broadband (eMBB), Massive Machine Type Communications (mMTC) and Ultra Reliable and Low latency Communications (URLLC). Use cases for 5G systems may focus on requirements such as higher data rate, higher spectrum efficiency, low power and higher energy efficiency, lower latency, higher reliability, and so forth. A range of spectrum bands, e.g., ranging from 700 MHz to 80 GHz may be considered for a variety of deployment scenarios.

In some cases, as carrier frequency increases, path loss becomes an increasing limitation to guaranteeing sufficient coverage. In millimeter wave systems, transmissions may also suffer from non-line-of-sight losses, e.g., diffraction loss, penetration loss, oxygen absorption loss, foliage loss, and so forth. The base station and WTRU may need to overcome such high path losses to discover each other during initial access. Utilizing a plurality (e.g., dozens or hundreds) of antenna elements to a generated beam formed signal may be an effective way to compensate for severe path loss, e.g., by providing sufficient beam forming gain. Beamforming techniques may include digital, analogue, hybrid, or any other suitable beamforming.

The procedure by which a WTRU acquires time and frequency synchronization with a cell and detects the Cell ID of that cell can be referred to as cell search. LTE synchronization signals may be transmitted in certain subframes; e.g., in the 0th and 5th subframes of every radio frame, and may be used for time and frequency synchronization during initialization. As part of the system acquisition process, a WTRU may synchronize sequentially to the OFDM symbol, slot, subframe, half-frame, and radio frame based on the synchronization signals.

The synchronization signals may be or include Primary Synchronization Signal (PSS) and Secondary Synchronization Signal (SSS). PSS may be used to obtain slot, subframe and half-frame boundaries and may also provide de physical layer cell identity (PCI) within the cell identity group. SSS may be used to obtain the radio frame boundary and may also be used by the WTRU to determine a cell identity group. The cell identity group may range, e.g., from 0 to 167. After a successful synchronization and PCI acquisition, the WTRU may decode the Physical Broadcast Channel (PBCH), e.g., with the help of CRS, and may acquire MIB information regarding system bandwidth, System Frame Number (SFN) and PHICH configuration. It should be noted the LTE synchronization signals and PBCH may be transmitted continuously, e.g., according to a standardized periodicity.

A base station (e.g., an eNB) and/or a WTRU may use a random access procedure for at least one of: WTRU initial access (e.g., to a cell or eNB), reset of UL timing (e.g., to reset or align WTRU UL timing with respect to a certain cell), and reset of timing during handover (e.g., to reset or align WTRU timing with respect to the handover target cell). The WTRU may transmit a certain physical random access channel (PRACH) preamble sequence at a certain power PPRACH, which may be based on configured parameters and/or measurements. The WTRU may transmit the preamble using a certain time-frequency resource or resources. The configured parameters, which may be provided or configured by the eNB, may include one or more of an initial preamble power (e.g., preambleInitialReceivedTargetPower), a preamble format based offset (e.g., deltaPreamble), a random access response window (e.g., ra-ResponseWindowSize), a power ramping factor (e.g., powerRampingStep), or a maximum number of retransmissions (e.g., preambleTransMax). Power ramping may refer to cases where a WTRU "ramps up" or increases the PRACH transmission power, e.g., by a step size in power. The WTRU may ramp up PRACH transmission power in each transmission or retransmission, e.g., to perform open-loop power control. The PRACH resources (which may include, e.g., preambles or sets of preambles and/or time/frequency resources which may be used for preamble transmission) may be provided or configured by the eNB. The measurements may include pathloss. In some implementations, the time-frequency resource or resources may be chosen by the WTRU from an allowed set or may be chosen by the eNB and signaled to the WTRU. After WTRU transmission of a preamble, if the eNB detects the preamble, it may respond with a random access response (RAR). If the WTRU does not receive an RAR for the transmitted preamble (e.g., which may correspond to a certain preamble index and/or time/frequency resource), e.g., within an allotted time (e.g., ra-ResponseWindowSize), the WTRU may send another preamble at a later time, at a higher power, (e.g., a power higher than the previous preamble transmission; e.g., by an amount powerRampingStep) where the transmission power may be limited by a maximum power; e.g., a WTRU configured maximum power which may be for the WTRU as a whole (e.g., which may be referred to as $P_{CMAX}$) or for a certain serving cell of the WTRU (e.g., which may be referred to as $P_{CMAX,c}$). The WTRU may wait again for receipt of an RAR from the eNB. This sequence of transmitting and waiting may continue until, e.g., the eNB responds with an RAR or e.g., until a maximum number of random access preamble transmissions (e.g., preambleTransMax) has been reached. The eNB may transmit and the WTRU may receive the RAR in response to a single preamble transmission.

A particular instance of a random access procedure may be contention-based or contention-free. A contention-free procedure may be initiated by a request, e.g., from an eNB, which may be initiated, e.g., via physical layer signaling, such as a physical downlink control channel (PDCCH) order, or by higher layer signaling such as an RRC reconfiguration message (e.g., an RRC connection reconfiguration message) which may include mobility control information and may, e.g., indicate or correspond to a handover request. For a contention-free procedure, which may be initiated by PDCCH order in subframe n, the PRACH preamble may be transmitted in the first subframe (or the first subframe available for PRACH) n+k2 where k2 may be >=6. After initiation by RRC command, other delays may occur, which may be specified (e.g., minimum and/or maximum required or allowed delays). The WTRU may autonomously initiate a contention-based procedure for reasons which may include for example, initial access, restoration of UL synchronization, or recovering from radio link failure. In some implementations, for certain events (e.g., events other than recovery from radio link failure), an amount of time after such events that the WTRU may send the PRACH preamble may not be defined or specified.

For a contention-free random access (RA) procedure, a network-signaled PRACH preamble may be used, e.g., by a WTRU. For a contention-based random access procedure, the WTRU may choose (e.g., autonomously) a preamble where the preamble format and/or the time/frequency resource(s) available for preamble transmissions may be based on an indication or index (e.g., prach-configIndex) which may be provided or signaled by the eNB.

One of the preambles transmitted at progressively higher transmit powers may be detected by the eNB. An RAR may be sent by the eNB in response to that one detected preamble. A PRACH preamble may be considered as a PRACH resource. For example, PRACH resources may include a PRACH preamble, time, and/or frequency resources. The terms RACH resources and PRACH resources may be used interchangeably. The terms RA, RACH, and PRACH may be used interchangeably.

In wireless communication systems where a central node (e.g., a gNB) serves a set of WTRUs, the opportunity to send transport blocks (TB) from those WTRUs to the central node may be administered by the central node. For example, the gNB may schedule individual UE uplink (UL) transmissions by assigning separate time-frequency resources to each WTRU and granting each resource to one WTRU. Such arrangements for UL transmission may be referred to as grant-based UL transmission. On the other hand, in some implementations, a gNB may announce the presence of one or more time-frequency resources, where a set of WTRUs may use each resource. Such implementations may allow access without a specific UL grant. Various use cases, e.g., considered during development of 3GPP New Radio (NR) may include ultra-reliable low-latency communication (URLLC), massive machine-type communication (mMTC or MMTC), or enhanced mobile broadband (eMBB or EMBB) communication. MMTC may enable communication between devices that are low-cost, massive in number and battery-driven, intended to support applications such as smart metering, logistics, and field and body sensors. URLLC may enable devices and machines to communicate reliably (e.g., with "ultra-reliability"), with very low latency and with high availability, e.g., in vehicular communication, industrial control, factory automation, remote surgery, smart grid or public safety applications. EMBB may provide enhancements to parameters such as data rate, delay and coverage of mobile broadband access.

In unlicensed bands, a gNB or a WTRU may need to perform a listen-before-talk (LBT) procedure before accessing the unlicensed wireless channel. The specific implementation of LBT differ, e.g., based on regulatory requirements of the unlicensed channel. In general, a LBT procedure may include a fixed- and/or random-duration interval where a wireless node (e.g., a gNB or a WTRU) "listens to" (i.e., senses) a medium and if the energy level detected from the medium (e.g., a specific frequency and/or time interval) is more than a threshold (e.g., as specified by a regulator) the gNB or WTRU refrains from transmitting any wireless signal. If the energy level is detected to be below the threshold, the wireless node may transmit its desired signal after completion of the LBT procedure.

In some regulatory regimes, LBT procedures are mandatory for unlicensed channel usage. For example, various LBT categories were adopted in 3GPP LAA (Release 13), eLAA (Release 14) and feLAA (Release 15). The LBT Category 4 (CAT 4) scheme, adopted in LAA/eLAA, may be a preferred scheme for certain use cases. The LBT CAT 4 procedure starts when an eNB or gNB (or in some cases a WTRU) has control information or data to transmit in an unlicensed channel. Such device may conduct an initial clear channel assessment (CCA), the channel is checked to determine whether it has been idle for a period of time (e.g., a sum of a fixed period of time and a pseudo-random duration). The availability of the channel may be determined, e.g., by comparing the level of energy detected (ED) across the bandwidth of the unlicensed channel to an energy threshold that is determined by a regulator.

If the channel is determined to be free, the transmission may proceed. If the channel is not determined to be free, the device may conduct a slotted random back-off procedure, e.g., where a random number is selected from a specified interval which may be referred to as a contention window. A back-off countdown may be obtained, it may be verified whether the channel is idle or not, and the transmission may be initiated when the back-off counter reaches zero (or any desired value indicating that back-off is complete). After the eNB or gNB has gained access to the channel, the eNB or gNB may be only allowed to transmit for a limited duration, which may be referred to as the maximum channel occupancy time (MCOT). The CAT 4 LBT procedure with random backoff and variable contention window sizes may enable fair channel access and good coexistence with other Radio Access Technologies (RATs), such as Wi-Fi and other LAA networks.

In licensed assisted non-standalone access, an unlicensed band operation may rely on the assistance of a primary component carrier in licensed band. In NR unlicensed (NR-U) standalone operation, all functionalities and features may be fulfilled on unlicensed bands, including initial access. Initial access may be implemented for standalone operation. It may be desired to enable initial access in a licensed band to be compatible with unlicensed band operation; e.g., due to spectrum characteristics and regulatory requirements, such as uncertainty of channel availability, the Occupied Channel Bandwidth (OCB) requirement, and so forth.

Some RATs (e.g., LTE) include a "four-step RACH." The four-step RACH may include transmission of a random access preamble ("Message 1") from the WTRU to the base station (e.g., eNB), transmission of a reply to the random access preamble ("Message 2" or random access response "RAR") from the base station (e.g., eNB) to the WTRU, transmission of a RRC connection request ("Message 3") from the WTRU to the BS (e.g., eNB), and transmission of a RRC connection reply ("Message 4") from the BS (e.g., eNB) to the WTRU.

NR may support multiple RACH preamble formats, e.g., including long PRACH formats with a preamble length of 839 and short PRACH format with a preamble length of 139. In general, for unlicensed band operation, the cell range may be smaller than that of licensed band operation; e.g., due to limited transmission power constraints. The short PRACH format may be more suitable for a relatively small cell in NR-U unlicensed bands. During RACH procedure, in some implementations LBT may be performed. LBT failure may lead to performance degradation of RACH performance. LBT failure before PRACH preamble transmission may also have an impact on the RACH resource configuration. PRACH preamble transmission may fulfil the regulatory requirement of OCB. Preamble and RACH procedures for unlicensed band operation may consider the impact of LBT and the requirement of OCB for NR-U.

Some approaches to facilitate compatibility of licensed band initial access with unlicensed band operation include PRACH Power Ramping based on LBT Status. For example, a WTRU may perform LBT before a PRACH transmission, such as transmission of a PRACH preamble. If LBT fails, the WTRU may retransmit on the PRACH. If LBT fails too many times, it may significantly delay WTRU access to the network. In some implementations, power ramping is used if the number of LBT failures exceed a certain threshold. Such threshold may be predetermined, configured or indicated. In some implementations, the WTRU may retransmit PRACH without power ramping if the number of LBT failures does not exceed the threshold. The WTRU may incur a large latency due to too many LBT failures. Accordingly, after certain number of LBT attempts, the WTRU may begin ramping up the power again to access the network.

Figure 2:
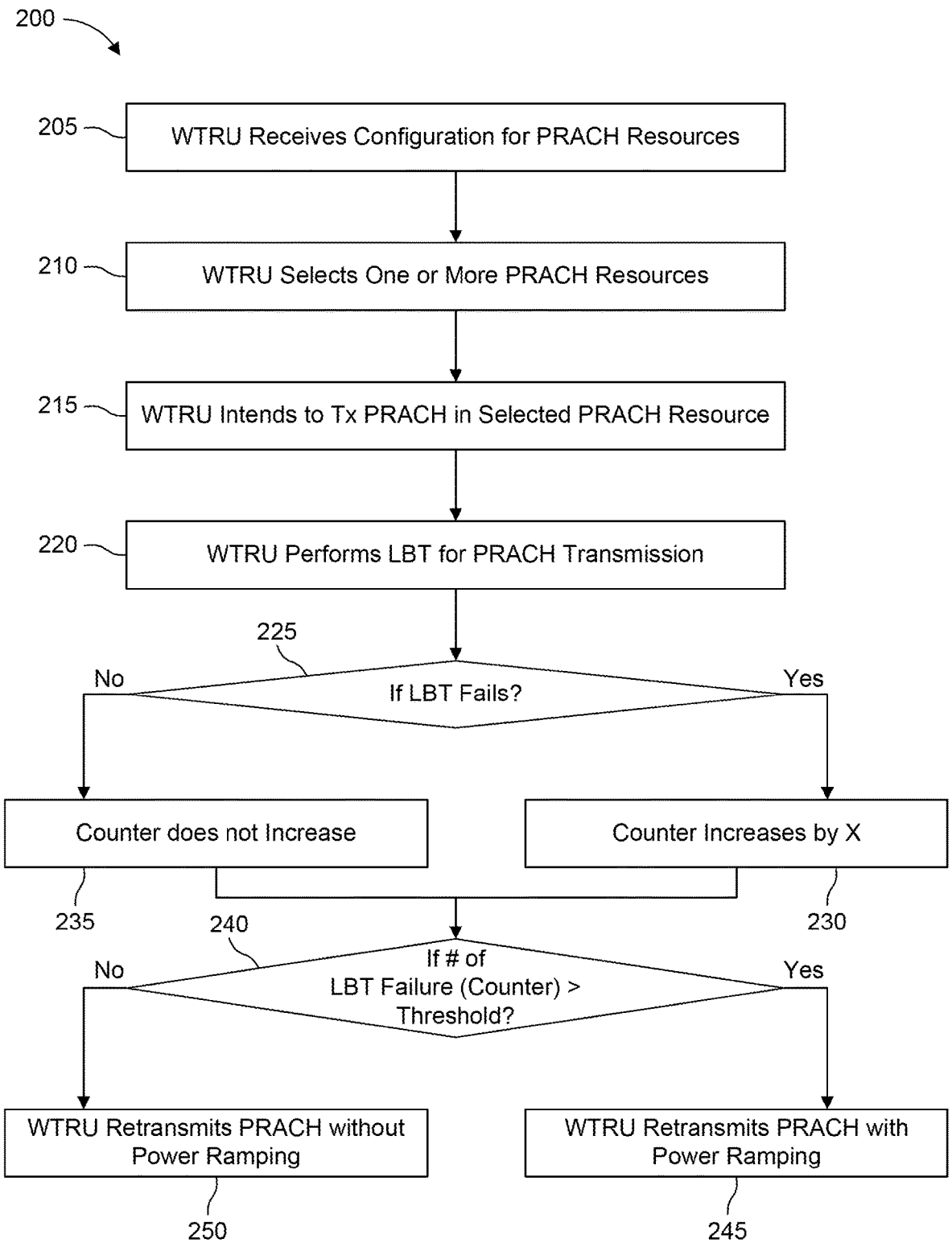
FIG. 2 is a flow chart illustrating an example method for WTRU PRACH power ramping based on LBT failure status implementable, for example, with the system shown and described with respect to FIG. 1A-D or portions thereof.

FIG. 2 is a flow chart illustrating an example method 200 for WTRU PRACH power ramping based on LBT failure status. Method 200 is implementable, for example, with the system shown and described with respect to FIG. 1A-D or portions thereof. In 205, the WTRU may receive configuration information for PRACH resources. For example, the WTRU may receive the configuration information for PRACH resources in a remaining minimum system information (RMSI). In 210, the WTRU may select one or more PRACH resources, e.g., according to configured PRACH resources. In 215, the WTRU may intend (e.g., be ready) to transmit in the selected PRACH resource or resources (e.g., a preamble or message 1). In 220, the WTRU may perform LBT for a PRACH transmission. For example, the WTRU may determine whether the medium (e.g., on one or more of the selected resources) is busy. On condition 225 that the LBT fails (e.g., the medium is busy), the WTRU may increase a counter in 230 (e.g., by an amount X) or otherwise track the number of LBT attempts. Such counter may be used to record or compute the number of failures of LBT. The step size X may be one or larger than one. The step size X for counter may be predetermined, configured or indicated either in a semi-static or dynamic manner. On condition 225 that LBT succeeds (e.g., the medium is not busy), the WTRU may not increase the counter in 235. 235 is described as separate for clarity, however it is noted that not increasing the counter may not require any action. On either condition 225, the WTRU may check LBT status, e.g., by checking the number of LBT failures. This may be done by comparing the value of the counter with a threshold. On condition 240 that the number of LBT failures exceeds a certain number (e.g., the counter is greater than a threshold), the WTRU may retransmit PRACH using power ramping in 245. On condition 240 that the number of LBT failures does not exceed the certain number (e.g., the value of counter is not greater than the threshold), the WTRU may retransmit PRACH without power ramping. In some implementations, the threshold may be predetermined, configured or indicated either in a semi-static or dynamic manner.

Some approaches to facilitate compatibility of licensed band initial access with unlicensed band operation include dynamic PRACH resource extension and indication. For example, to increase transmission opportunities for PRACH, in some implementations, more PRACH resources may be configured for the WTRU. If the WTRU fails to transmit or retransmit PRACH, e.g., due to LBT failure, a larger amount of PRACH resources may be used. Otherwise, normal PRACH resources may be used. Accordingly, some implementations may include semi-static PRACH resources for different cases. For example, a larger amount of semi-static PRACH resources may be configured for the WTRU for PRACH transmission if the WTRU fails too many PRACH transmissions; e.g., due to LBT failure.

Some implementations may include dynamic allocation of PRACH resources. For example, a larger semi-static PRACH resources may be indicated to the WTRU for PRACH transmission if the WTRU fails too many PRACH transmissions; e.g., due to LBT failure. Some implementations may include a hybrid of semi-static and dynamic allocation of PRACH resources. For example, a WTRU may be configured with a base amount of PRACH resources. If the WTRU fails too many PRACH transmissions; e.g., due to LBT failure, further PRACH resources beyond the base PRACH resources may be used. Such additional PRACH resources may be indicated to WTRU. The WTRU may report LBT status to gNB. If the number of LBT failures exceeds a certain threshold, further PRACH resources may be used. The WTRU may be indicated for additional PRACH resources; e.g., to increase the chance for the WTRU to access network. If the number of LBT failures does not exceed a certain threshold, a base amount of PRACH resources may be used for the WTRU to access the network. Dynamic PRACH resources may be conveyed to the WTRU, e.g., via a group common control, such as group common PDCCH (GC-PDCCH), or other control channel or signaling, either common, dedicated or otherwise. The WTRU may report LBT status via PRACH, e.g., preamble partitions, PRACH resources partitions, offset (e.g., time, frequency offsets), a combination of these or otherwise.

The RAR window may depend on LBT status. If the WTRU fails too many PRACH transmissions, e.g., due to LBT failure, the RAR window may be extended, or an extended RAR window may be used. Otherwise, if the WTRU does not fail too many PRACH transmissions, e.g., due to LBT failure, a normal RAR window may be used. The WTRU may report LBT status, e.g., including a number of non-transmitted PRACH (or failures to retransmit PRACH), e.g., due to LBT failure (or number of LBT failures).

Figure 3:
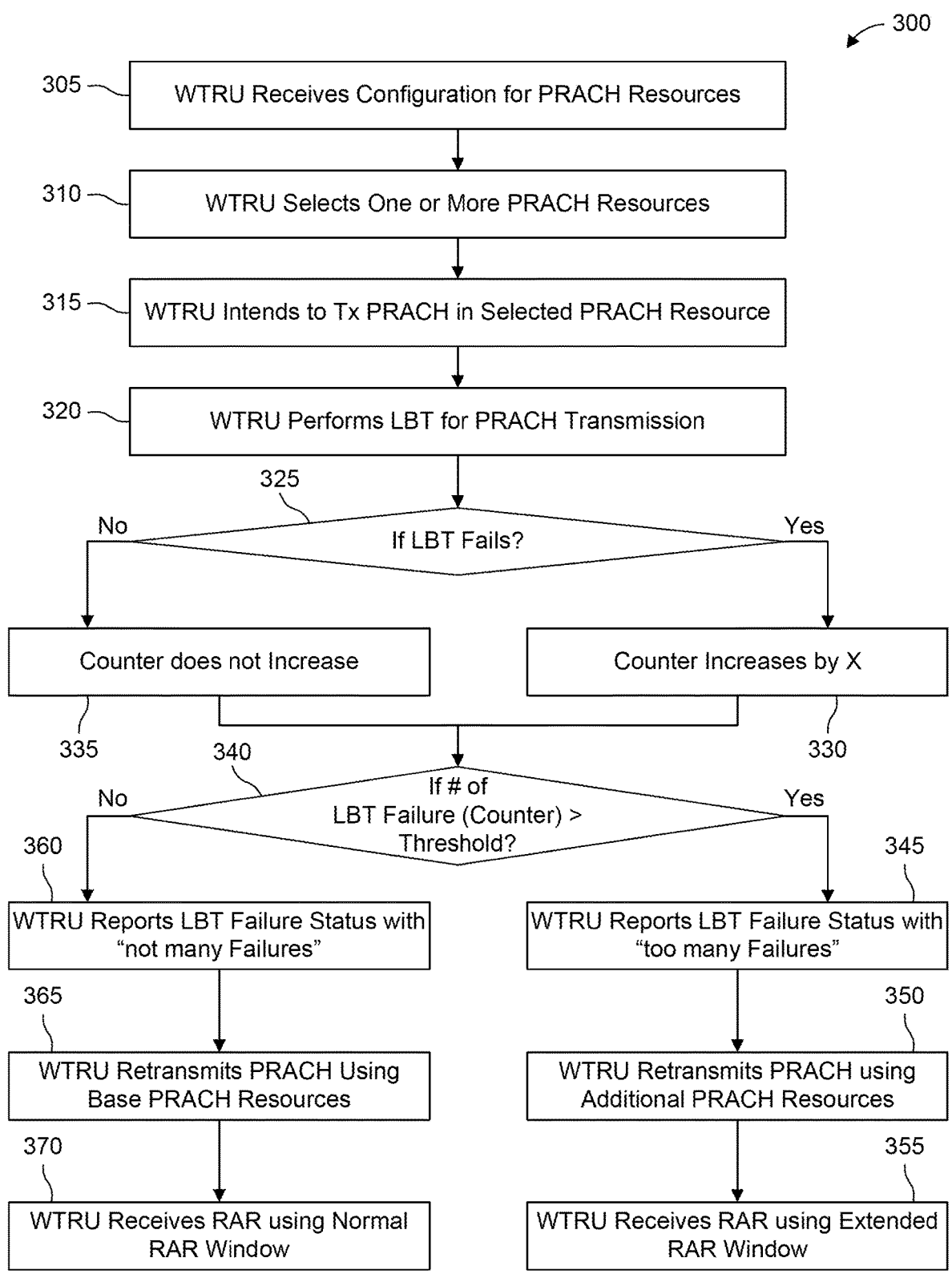
FIG. 3 is a flow chart illustrating an example method for WTRU PRACH resource and RAR window size based on LBT failure status implementable, for example, with the system shown and described with respect to FIG. 1A-D or portions thereof.

FIG. 3 is a flow chart illustrating an example method 300 for determining WTRU PRACH resources and RAR window size based on LBT failure status, which is implementable, for example, with the system shown and described with respect to FIG. 1A-D or portions thereof. In the method of FIG. 3, the WTRU may receive configuration information for PRACH resources in 305. For example, the WTRU may receive the configuration information for PRACH resources in a remaining minimum system information (RMSI). In 310, the WTRU may select one or more PRACH resources, e.g., according to configured PRACH resources. In 315, the WTRU may intend (e.g., be ready) to transmit (e.g., a preamble or message 1) in the selected PRACH resource or resources. In 320, the WTRU may perform LBT for the PRACH transmission. For example, the WTRU may check the status of LBT. On condition 325 that the LBT fails (e.g., the medium is busy), the WTRU may increase a counter in 330 (e.g., by an amount X) or otherwise track the number of LBT attempts. Such counter may be used, e.g., to record or compute the number of LBT failures. The step size of X may be one or larger than one. The step size of X for the counter may be predetermined, configured or indicated either in a semi-static or dynamic manner. On condition 325 that LBT succeeds (e.g., the medium is not busy), the WTRU may not increase the counter in 335. 335 is described as separate for clarity, however it is noted that not increasing the counter may not require any action. On either condition 325, the WTRU may check the status of LBT by checking the number of LBT failures. This may be done e.g., by comparing the value of the counter with a threshold. On condition 340 that the number of LBT failures exceeds a certain number (e.g., the counter is greater than a threshold), the WTRU may report LBT failure status as excessive in 345 ("too many failures" in the figure). In some implementations, the WTRU may report LBT failure status as excessive to gNB in 345. In some implementations, the WTRU may report LBT failure status as excessive to the MAC layer or a higher layer of WTRU in 345. In any of these cases, the WTRU may retransmit PRACH using additional PRACH resources in addition to the base PRACH resources in 350, and the WTRU may receive an RAR using an extended RAR window (e.g., an extended RAR window size) in 355.

On condition 340 that the number of LBT failures does not exceed a certain number (e.g., the value of counter is not greater than a threshold), the WTRU may report LBT failure status as not excessive ("not many failures" in the figure) in 360. In this case, the WTRU may retransmit PRACH using base PRACH resources only in 365, and the WTRU may receive an RAR using a normal RAR window in 370 (e.g., using a normal or standard RAR window size, e.g., according to a standard). The threshold may be predetermined, configured or indicated either in a semi-static or dynamic manner.

Some approaches to facilitate compatibility of licensed band initial access with unlicensed band operation include association for PRACH retransmission and RAR window. For example, LBT may be performed before RAR transmission. If LBT fails, RAR may not be transmitted. To increase the RAR transmission success rate, a larger RAR window size may be used. For example, in some implementations a RAR window size may be increased from 10 ms to 20 ms, 40 ms or larger.

The WTRU may transmit on PRACH, and a gNB may detect the PRACH and transmit a RAR. However, if the WTRU cannot receive the RAR, the WTRU may retransmit the PRACH. The WTRU may fail to receive RAR for various reasons, such as the PRACH not having been transmitted (e.g., due to LBT failure), the gNB not having detected the PRACH, the PRACH having been detected but RAR was not transmitted (e.g., due to LBT failure), the RAR having been transmitted but not received (e.g., due to poor link quality), the RAR having been transmitted but not having been received (e.g., due to a hidden node condition), or otherwise.

To increase the chance that a RAR is received by the WTRU, in some implementations, the WTRU may ramp up the power for a PRACH transmission (e.g., to handle cases where the PRACH is not detected due to insufficient power). In some implementations, the opportunity for successful RAR transmission may be increased, e.g., via a larger RAR window size. In some implementations, RAR transmit power may be increased, e.g., to facilitate the RAR in coping with poor link quality. The RAR transmit power may be derived from or based on PRACH power level. For example, if PRACH power is higher, RAR transmit power may also be set higher. If PRACH power is increased, RAR transmit power may also be increased. RAR transmit power may be associated with PRACH power.

Some implementations may transmit multiple RARs within a single RAR window. This may be advantageous, for example, where a WTRU has multiple opportunities to receive RARs. At a particular time instance, if the WTRU fails RAR reception, e.g., due to a hidden node condition, the WTRU may still have other opportunities to receive RAR again with the same RAR window. The WTRU may report hidden node information to the gNB. Hidden node information may be embedded or carried in the PRACH. For example, different PRACH preamble partitions, sequences, resources, offset (e.g., time, frequency offset), RACH occasion (RO) partitions or groups, or combination of these may be used to indicate the hidden node status. For example, the WTRU may select a partition A or a resource A to indicate that the hidden node is present. In the example, the WTRU may select a partition B or resource B to indicate that a hidden node is not present. A gNB may transmit a RAR based on hidden node status or information. For example, a single RAR may be transmitted if the hidden node status indicates that the hidden node is not present, and multiple RARs may be transmitted if the hidden node status indicates that a hidden node is present. Some implementations use multiple RAR windows, e.g., having the same or different window sizes. Multiple RAR windows may be non-consecutive or consecutive, distributed or localized.

Some approaches to facilitate compatibility of licensed band initial access with unlicensed band operation include PRACH Transmission and Power Ramping Enhancements. For example, power ramping may be based on or as a function of at least one, some or all of the following: RAR reception status, LBT status, hidden node status, beam switching status, other related status or a combination of these.

Figure 4:
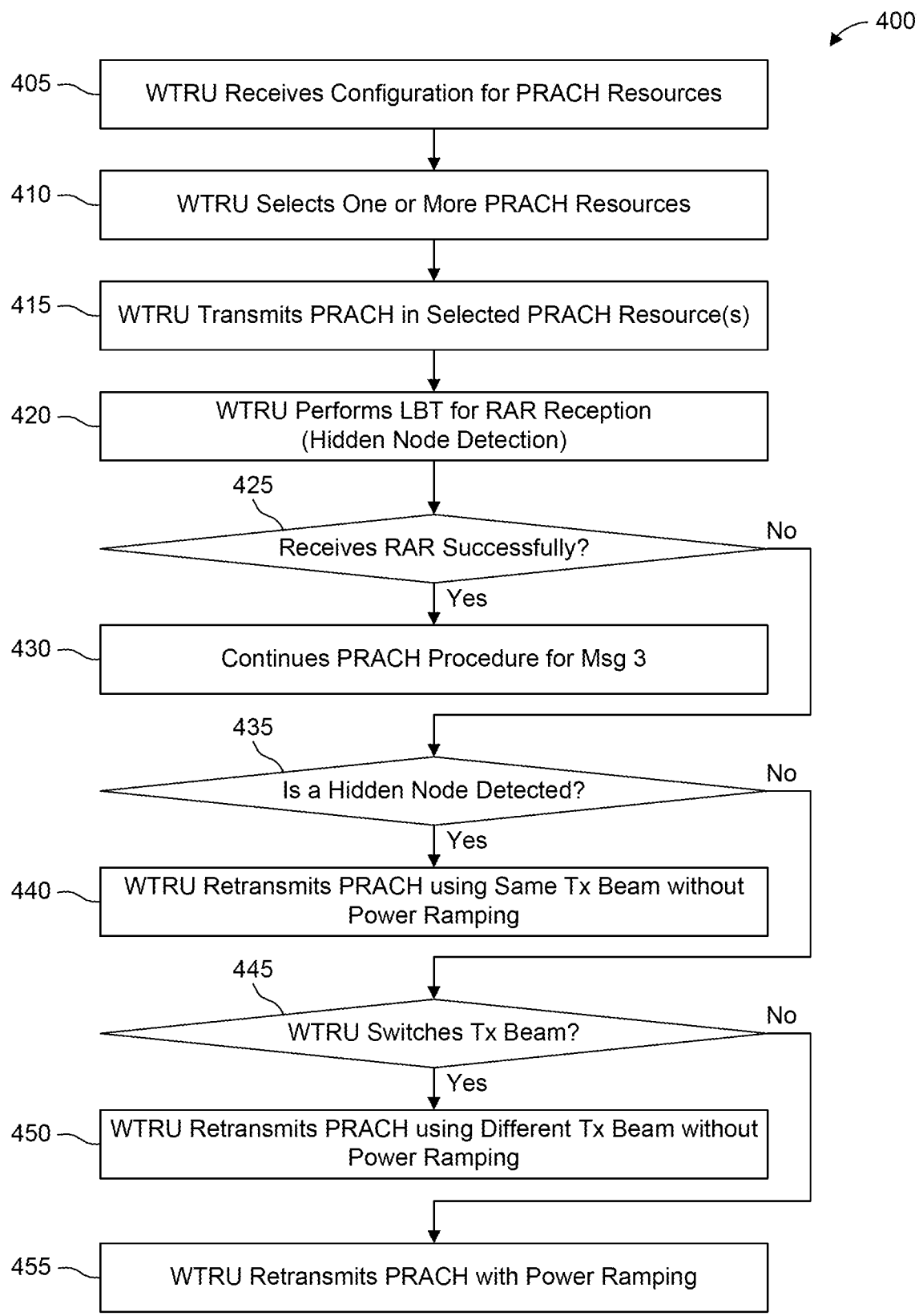
FIG. 4 is a flow chart illustrating an example method for WTRU PRACH power ramping based on beamswitching and hidden node status implementable, for example, with the system shown and described with respect to FIG. 1A-D or portions thereof.

FIG. 4 is a flow chart illustrating an example method 400 for WTRU PRACH power ramping based on beamswitching and hidden node status. Method 400 is implementable, for example, with the system shown and described with respect to FIG. 1A-D or portions thereof. In 405, the WTRU may receive configuration information for PRACH resources. For example, the WTRU may receive the configuration information for PRACH resources in a remaining minimum system information (RMSI). In 410, the WTRU may select one or more PRACH resources, e.g., according to configured PRACH resources. In 415, the WTRU may transmit the PRACH preamble in the selected PRACH resource or resources (e.g., a preamble or message 1) after performing an LBT procedure to access the PRACH. The LBT procedure may include any LBT procedure as described herein, or subset or combination thereof (e.g., as shown and described with respect to FIG. 2 and/or FIG. 3.

In 420, the WTRU may perform LBT for the RAR reception, e.g., to detect hidden nodes, and may begin monitoring for a RAR. The WTRU may perform LBT before each intended RAR reception. For example, in some implementations the WTRU may perform energy-based LBT before each RAR reception to detect hidden nodes. If the measured energy is above a predetermined, configured or indicated threshold, a hidden node has been detected by the WTRU. Otherwise, a hidden node has not been detected by the WTRU. In some implementations, the WTRU may perform signature-based LBT before each RAR reception to detect hidden nodes. For example, if a measured correlation (e.g., correlation with possible signatures) is above a predetermined, configured or indicated threshold, the WTRU has detected a hidden node. Otherwise, the WTRU has not detected a hidden node.

On condition 425 that the WTRU receives the RAR successfully, the WTRU may continue the RACH procedure, may transmit a Message 3 accordingly, and may continue the RACH procedure to completion. A message 3 is an uplink message transmitted by WTRU in step 3 of a 4-step RACH (e.g., as discussed above). Message 3 is used to respond to message 2 (Downlink) which is random access response (RAR) in step 2 of 4-step RACH.

On condition 425 that the WTRU does not receive the RAR successfully, the WTRU may further check hidden node status. The WTRU may respond to the RAR reception failure in different ways based on the hidden node status. For example, on condition 435 that a hidden node is detected or identified, the WTRU may retransmit the PRACH preamble using the same transmit beam without power ramping in 440.

On condition 435 that a hidden node is not detected or not identified, the WTRU may further check the status of its beam switching, and determine power ramping accordingly. For example, the WTRU may decide to switch its transmit beam or decide not to switch its transmit beam according to various conditions, such as PRACH preamble transmission failure, PRACH preamble retransmission failure, number of PRACH preamble retransmission failures, detected interference direction, detected hidden node conditions, and so on.

On condition 445 that the WTRU switches transmit beams, the WTRU may retransmit PRACH using a different transmit beam (e.g., per the beam switching) without power ramping (e.g., without increasing the transmission power). This may have the advantage of saving power in cases RAR reception failure is resolvable by beam switching. On condition 445 that the WTRU does not switch transmit beams, the WTRU may retransmit PRACH with power ramping (e.g., with increased transmission power) in 455. This may have the advantage of overcoming interference in cases where beam switching does not occur.

Figure 5:
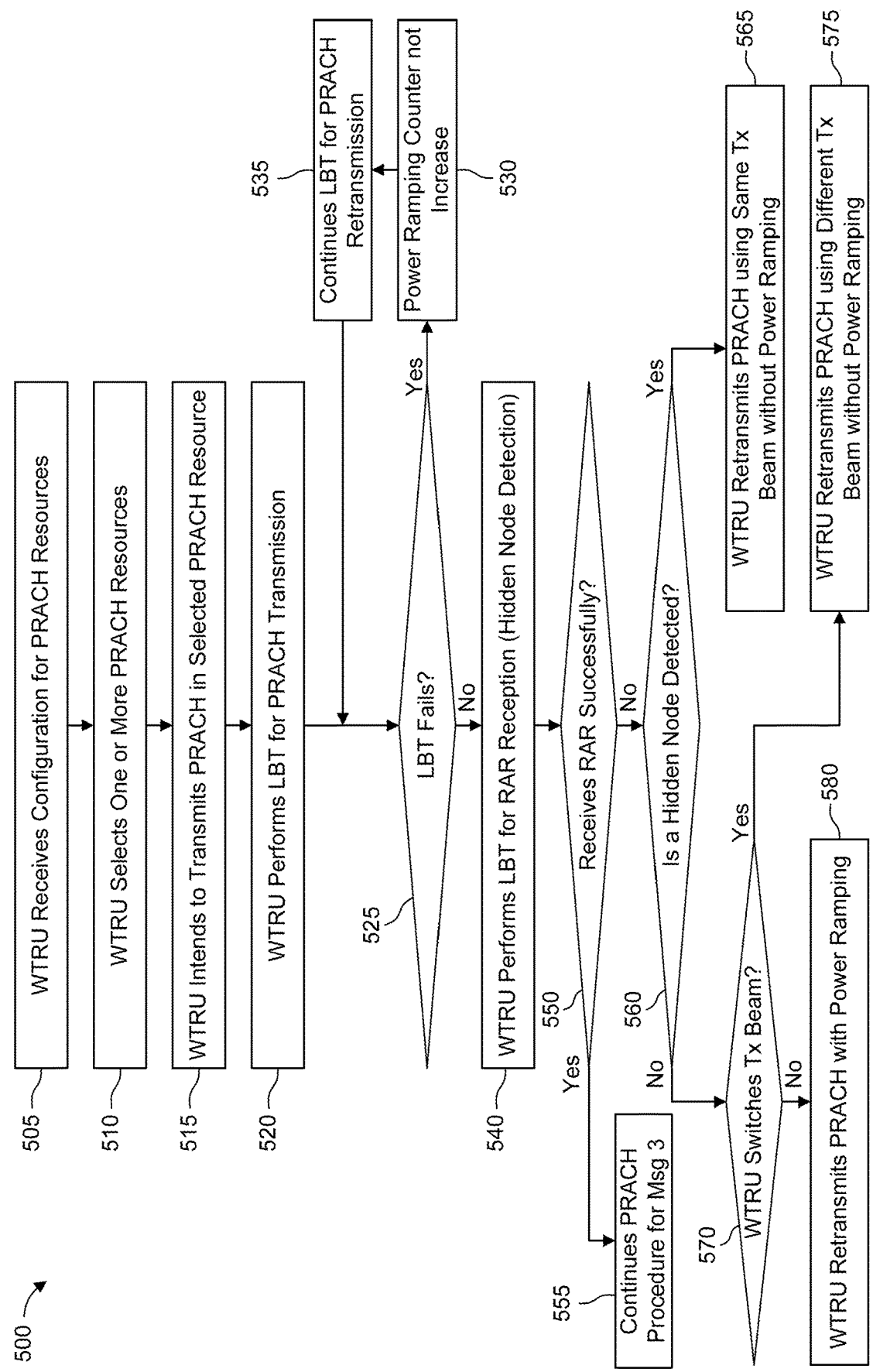
FIG. 5 is a flow chart illustrating an example method for WTRU PRACH power ramping based on beamswitching, hidden node, and LBT status implementable, for example, with the system shown and described with respect to FIG. 1A-D or portions thereof.

FIG. 5 is a flow chart illustrating an example method 500 for WTRU PRACH power ramping based on beamswitching, hidden node, and LBT status. Method 500 is implementable, for example, with the system shown and described with respect to FIG. 1A-D or portions thereof. In 505, the WTRU may receive configuration information for PRACH resources. For example, the WTRU may receive the configuration information for PRACH resources in a remaining minimum system information (RMSI). In 510, the WTRU may select one or more PRACH resources according to configured PRACH resources. In 515, the WTRU may intend (e.g., be ready) to transmit in the selected PRACH resource or resources (e.g., a preamble or message 1).

In 520, the WTRU may perform an LBT procedure for the PRACH transmission. On condition 525 that the LBT fails, the WTRU may not perform power ramping, and the WTRU may not increase the power ramping counter in 530 (530 is described as separate for clarity, however it is noted that not increasing the counter may not require any action). In 535, the WTRU may continue performing LBT for any next and/or subsequent PRACH retransmission, and may perform LBT for the next and/or subsequent PRACH retransmissions. In 540, the WTRU may perform LBT for the RAR reception, e.g., to detect hidden nodes, and may begin monitoring for an RAR. WTRU may perform LBT before each intended RAR reception. For example, in some implementations the WTRU may perform energy-based LBT before each RAR reception to detect hidden nodes. If the measured energy is above a predetermined, configured or indicated threshold, a hidden node has been detected by the WTRU. Otherwise, a hidden node has not been detected by the WTRU. In some implementations, the WTRU may perform signature-based LBT before each RAR reception to detect hidden nodes. For example, if a measured correlation (e.g., correlation with possible signatures) is above a predetermined, configured or indicated threshold, then the WTRU has detected a hidden node. Otherwise, the WTRU has not detected a hidden node.

On condition 550 that the WTRU receives the RAR successfully, the WTRU may continue the RACH procedure, the WTRU may transmit a Message 3 accordingly, and may continue the RACH procedure to completion. On condition 550 that the WTRU does not receive the RAR successfully, the WTRU may check hidden node status. The WTRU may respond to the RAR reception failure differently based on the hidden node status. For example, on condition 560 that a hidden node is detected or identified, the WTRU may retransmit the PRACH preamble using the same transmit beam without power ramping in 565. On condition 560 that a hidden node is not detected or not identified, the WTRU may further check the status of its beam switching, and determine power ramping accordingly. On condition 570 that the WTRU switches transmit beams, the WTRU may retransmit the PRACH preamble using the different transmit beam without power ramping in 575. On condition 570 that the WTRU does not switch transmit beams, the WTRU may retransmit the PRACH preamble with power ramping in 575.

Some approaches to facilitate compatibility of licensed band initial access with unlicensed band operation include contention window size-based PRACH transmission and retransmission. For example, a PRACH transmission (or retransmission) index may be used to adapt or adjust a contention window (CW) for LBT. A PRACH transmission (retransmission) index may be used, e.g., to adapt or adjust contention a window size (CWS) for LBT for a PRACH transmission. If LBT fails, the WTRU may not retransmit PRACH and may wait a random back-off time to retransmit. For a high priority PRACH, a random back-off timer may be set to a smaller value while a normal RACH (or lower priority RACH) may use a normal (or higher valued) random back-off timer.

LBT duration may depend on the number of LBT failures. For example, for an initial transmission, a normal duration LBT (which may be referred to as T1) may be used. For a first PRACH retransmission, a smaller duration LBT (which may be referred to as T2) may be used. For a second PRACH retransmission, a yet smaller duration LBT (which may be referred to as T3) may be used, and so on as ... T3<T2<T1. The LBT duration may be derived from CWS or based on CWS.

For different priorities, the value of T1 may also be different. For example, the WTRU may use two different values for T1 (which may be referred to as T1_hp and T1_lp). T1_hp is for high priority RACH and T1-lp is for low priority RACH (or normal RACH). Similarly, for each T2 and T3, the WTRU may use T2_hp and T2_lp and T3_hp and T3_lp and so on for high priority and low priority (or normal priority) PRACH transmissions.

PRACH transmissions may be based on or depend on at least one, some or all of the following: LBT duration (e.g., CWS) (e.g., small CWS for high priority RACH and regular CWS for normal RACH); Priority (e.g., high priority RACH and normal RACH); Number of LBT failure (e.g., if LBT fails too much, short duration LBT or no LBT may be used for PRACH transmission or retransmission; random back-off timer (e.g., small random back-off time for high priority RACH and regular random back-off time for normal RACH); preamble power ramping (e.g., larger power ramping for high priority RACH and regular power ramping for normal RACH); initial preamble power (e.g., larger initial power for high priority RACH and regular initial power for normal RACH); latency requirements; or any combination of these.

Any of the techniques exemplified above or other combinations of above features may be possible and may be used for PRACH enhancement for NR unlicensed spectrum.

Figure 6:
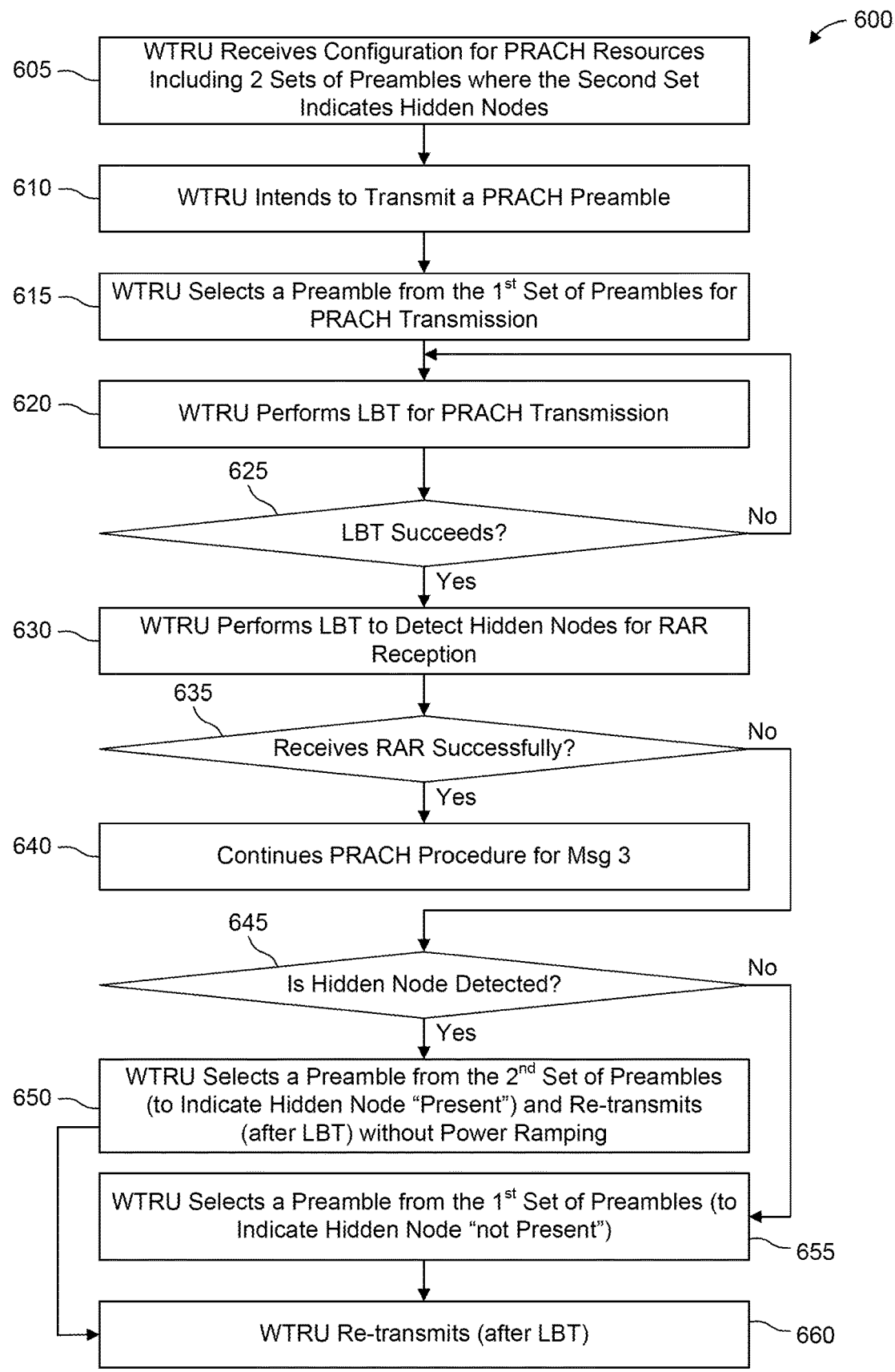
FIG. 6 is a flow chart illustrating an example method for hidden node detection using more than one set of PRACH preambles, implementable, for example, with the system shown and described with respect to FIG. 1A-D or portions thereof.

FIG. 6 is a flow chart illustrating an example method 600 for hidden node detection using more than one set of PRACH preambles. Method 600 is implementable, for example, with the system shown and described with respect to FIG. 1A-D or portions thereof. In 605, the WTRU may receive configuration information for two sets of PRACH resources. One set of PRACH resources may be used to indicate that hidden nodes have not been detected, and the other set of PRACH resources may be used to indicate that hidden nodes have been detected. The WTRU may receive the configuration information for PRACH resources in a remaining minimum system information (RMSI). In 610, the WTRU may intend (e.g., be ready) to transmit a PRACH preamble (or message 1). In 615, the WTRU may select one or more PRACH resources according to configured PRACH resources. In 620, the WTRU may perform LBT for the PRACH preamble transmission. On condition 625 that the LBT fails, the WTRU may return to 620 to continue performing LBT for the PRACH preamble transmission. On condition 625 that the LBT succeeds, the WTRU may transmit the PRACH preamble using the selected PRACH resources, and the WTRU may perform LBT for the RAR reception, e.g., to detect hidden nodes, in 630, and may begin monitoring for an RAR. For example, in some implementations the WTRU may perform energy-based LBT before each RAR reception to detect hidden nodes. If the measured energy is above a predetermined, configured or indicated threshold, a hidden node has been detected by the WTRU. Otherwise, a hidden node has not been detected by the WTRU. In some implementations, the WTRU may perform signature-based LBT before each RAR reception to detect hidden nodes. For example, if a measured correlation (e.g., correlation with possible signatures) is above a predetermined, configured or indicated threshold, the WTRU has detected a hidden node. Otherwise, the WTRU has not detected a hidden node.

On condition 635 that the WTRU receives the RAR successfully, the WTRU may continue the RACH procedure in 640, may transmit a Message 3 accordingly, and may continue the RACH procedure to completion.

On condition 635 that that the WTRU does not receive the RAR successfully, the WTRU may check hidden node status. The WTRU may respond to the RAR reception failure in different ways based on the hidden node status. For example, on condition 645 that a hidden node is detected or identified, the WTRU may select a preamble from the second set of preambles (e.g., to indicate that a hidden node has been detected or identified) and may retransmit the PRACH transmission (e.g., Message 1 retransmission) using a preamble from the second set of preambles (e.g., after another LBT for the PRACH retransmission), without power ramping in 650.

On condition 645 that a hidden node is not detected or identified, the WTRU may select a preamble from the first set of preambles (e.g., to indicate that a hidden node has not been detected or identified) and may retransmit the PRACH transmission (e.g., Message 1 retransmission) using a preamble from the first set of preambles (e.g., after another LBT for the PRACH retransmission) in 660. The PRACH retransmission may be performed with power ramping or without power ramping in 660. Whether to perform power ramping or not for PRACH preamble retransmission may depend on whether WTRU decides to switch its transmit beam or not. For example, if WTRU decides to switch its transmit beam, then WTRU may not perform power ramping for PRACH retransmission in the new transmit beam that WTRU switches to. If WTRU decides not to switch its transmit beam, then WTRU may perform power ramping for PRACH retransmission in the current transmit beam.

Figure 7:
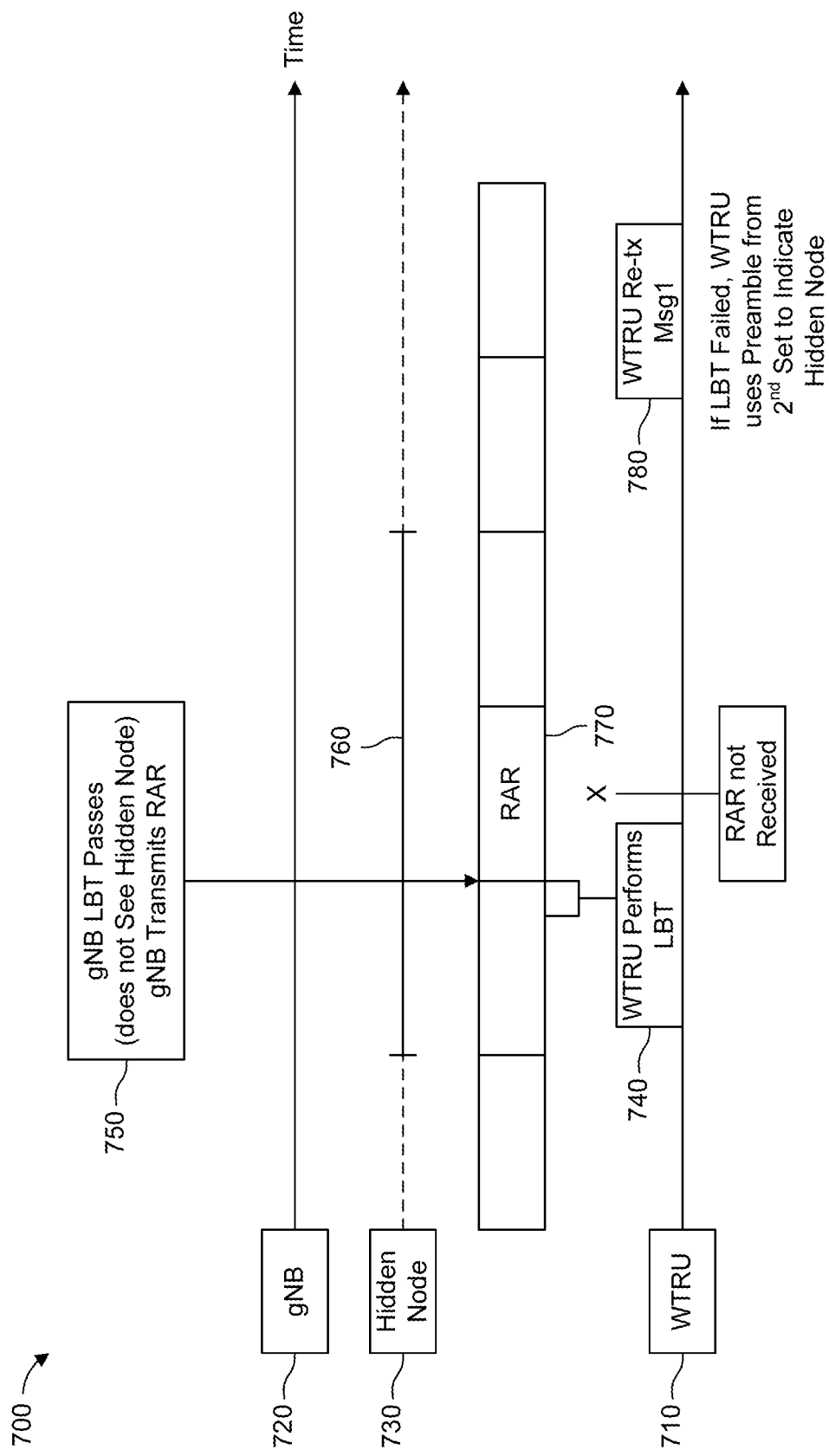
FIG. 7 is a block diagram illustrating example communications between a WTRU and a gNB under hidden node conditions.

FIG. 7 is a block diagram illustrating example hidden node detection communications 700 between a WTRU 710 and a gNB 720 in the presence of a hidden node 730. Communications 700 illustrate, for example, portions of method 600 as shown and described with respect to FIG. 6. In this example, WTRU 710 has previously transmitted a PRACH preamble to gNB 720. This preamble is selected from a first set of preambles that does not indicate the presence of (or interference by) a hidden node, or indicates that no hidden node is present and/or interfering with the PRACH resources. WTRU 710 performs a LBT procedure 740 during a time interval preceding (e.g., immediately preceding, or a suitable time before) the RAR window 770 corresponding to the PRACH preamble. A suitable time interval is of a duration and time period sufficient to determine the presence of and/or interference by a hidden node; e.g., with a desired degree of certainty. In this case, WTRU 710 detects the presence of the hidden node 730, which is interfering with the PRACH resources during time period 760. Based on the detection of hidden node 730, WTRU 710 interprets a failure to receive a RAR during RAR window 770 as due to the interference from hidden node 730. Accordingly, WTRU 710 retransmits the PRACH preamble in Message 780 using a preamble based on a second set of preambles which indicate the presence of (or interference by) a hidden node.

Although the features and elements of the present invention are described in the examples particular combinations, each feature or element can be used alone without the other features and elements of the examples or in various combinations with or without other features and elements of the present invention. Although the solutions described herein consider LTE, LTE-A, New Radio (NR) or 5G specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. For example, power ramping of PRACH preamble transmissions based on a threshold number of LBT failures, as shown an described with respect to FIG. 3, may be combined with the PRACH preamble transmission shown and described with respect to FIG. 4, and so forth. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) configured for random access to a channel, the WTRU comprising:
   a receiver configured to receive a configuration for a first set of PRACH preambles and for a second set of PRACH preambles;
   a transmitter configured to send a message transmission to a base station, the message transmission including a PRACH preamble from the first set;
   the receiver configured to, on a condition that a random access response (RAR) is not received during a RAR window and that a hidden node is detected, retransmit the message to the base station, wherein the message retransmitted includes a PRACH preamble from the second set.

2. The WTRU of claim 1, wherein the hidden node is detected by a listen before talk (LBT) procedure.

3. The WTRU of claim 1, wherein the transmitter is configured to power ramp the message retransmission on the condition that the hidden node is detected.

4. The WTRU of claim 1, wherein the transmitter is configured to, on the condition that the hidden node is not detected, power ramp the message retransmission on a condition that the WTRU has switched transmission antenna beam from the message transmission.

5. The WTRU of claim 1, wherein the transmitter is configured to, on a condition that the hidden node is not detected, send the message retransmission without power ramping on a condition that the WTRU has not switched antenna beam from the message transmission.

6. The WTRU of claim 1, wherein the processor is configured to perform a listen before talk (LBT) procedure prior to the transmitter sending the message transmission to the base station.

7. The WTRU of claim 6, wherein the transmitter is configured to send the message transmission to the base station based on power ramping on a condition that the LBT procedure has failed a threshold number of times.

8. The WTRU of claim 6, wherein the processor is configured to repeat the LBT procedure on a condition that the LBT procedure has not failed a threshold number of times.

9. The WTRU of claim 6, wherein the transmitter is configured to, on a condition that the LBT procedure has failed a threshold number of times, send the message retransmission using additional PRACH resources; and wherein the receiver is configured to, on a condition that the LBT procedure has failed the threshold number of times, attempt to receive the RAR in an extended RAR window.

10. A method for random access to a channel by a wireless transmit/receive unit (WTRU), the method comprising:
    receiving a configuration for a first set of PRACH preambles and for a second set of PRACH preambles;
    sending a message transmission to a bast station, the message transmission including a PRACH preamble from the first set;
    on a condition that a random access response (RAR) is not received during a RAR window and that a hidden node is detected, retransmitting the message to the base station, wherein the message retransmission includes a PRACH preamble from the second set.

11. The method of claim 10, wherein the hidden node is detected by a listen before talk (LBT) procedure.

12. The method of claim 10, wherein the message retransmission is power ramped on the condition that the hidden node is detected.

13. The method of claim 10, further comprising performing a listen before talk (LBT) procedure prior to sending the message retransmission to the base station.

14. The method of claim 13, further comprising sending the message transmission to the base station based on power ramping on a condition that the LBT procedure has failed a threshold number of times.

15. The method of claim 13, further comprising repeating the LBT procedure on a condition that the LBT procedure has not failed a threshold number of times.

16. The method of claim 13, further comprising, on a condition that the LBT procedure has failed a threshold number of times, sending the message retransmission using additional PRACH resources and attempting to receive the RAR in an extended RAR window.

* * * * *